United States Patent [19]

Tatsumi

[11] Patent Number: 4,635,508

[45] Date of Patent: Jan. 13, 1987

[54] SAFETY CONTROL DEVICE FOR AUTOMATIC TRANSMISSION

[75] Inventor: Takumi Tatsumi, Hyogo, Japan

[73] Assignee: Mitsubishi Denki K.K., Tokyo, Japan

[21] Appl. No.: 618,157

[22] Filed: Jun. 7, 1984

[30] Foreign Application Priority Data

Jun. 16, 1983 [JP] Japan ............... 58-109598

[51] Int. Cl.⁴ ............ B60K 41/08; G06F 15/50
[52] U.S. Cl. ............... 74/866; 74/861; 74/878; 364/424.1
[58] Field of Search ........ 74/866, 862, 863, 864, 74/865, 870, 871, 752 A, 752 D; 364/424.1, 861, 878

[56] References Cited

U.S. PATENT DOCUMENTS

| | | | |
|---|---|---|---|
| 3,724,295 | 4/1973 | Wakamatsu | 74/752 D X |
| 3,797,330 | 3/1974 | Ushijima | 74/752 |
| 4,253,348 | 3/1981 | Will et al. | 74/866 |
| 4,338,832 | 7/1982 | Pelligrino | 74/866 |
| 4,373,619 | 2/1983 | Schritt et al. | 74/866 X |
| 4,393,732 | 8/1983 | Suzuki et al. | 364/424.1 X |
| 4,485,444 | 11/1984 | Maruyama | 364/424.1 X |
| 4,495,457 | 1/1985 | Stahl | 364/424.1 |
| 4,499,542 | 2/1985 | Hamajima | 74/866 X |
| 4,523,281 | 6/1985 | Noda et al. | 364/424.1 |

FOREIGN PATENT DOCUMENTS

1493191 11/1977 United Kingdom ............ 364/424.1

*Primary Examiner*—Kenneth J. Dorner
*Assistant Examiner*—Stephen B. Andrews
*Attorney, Agent, or Firm*—Sughrue, Mion, Zinn, Macpeak & Seas

[57] ABSTRACT

A control apparatus for controlling the gear engaged by an automatic transmission of a motor vehicle, whereby gear change operations are temporarily inhibited when a signal indicative of a fault condition in a load signal or a speed signal is sensed. The signals representing the speed and load of the vehicle are ordinarily employed directly to determine the gear engaged by the transmission. If a fault condition, such as may be due to a short circuit or open circuit of the corresponding sensor, is detected, to prevent skidding due to a sudden change to an incorrect gear, the gear presently engaged is held for a predetermined period of time. After that predetermined period of time, if the fault condition still exists, the transmission is shifted to the safest gear. Otherwise, the present gear is maintained.

5 Claims, 4 Drawing Figures

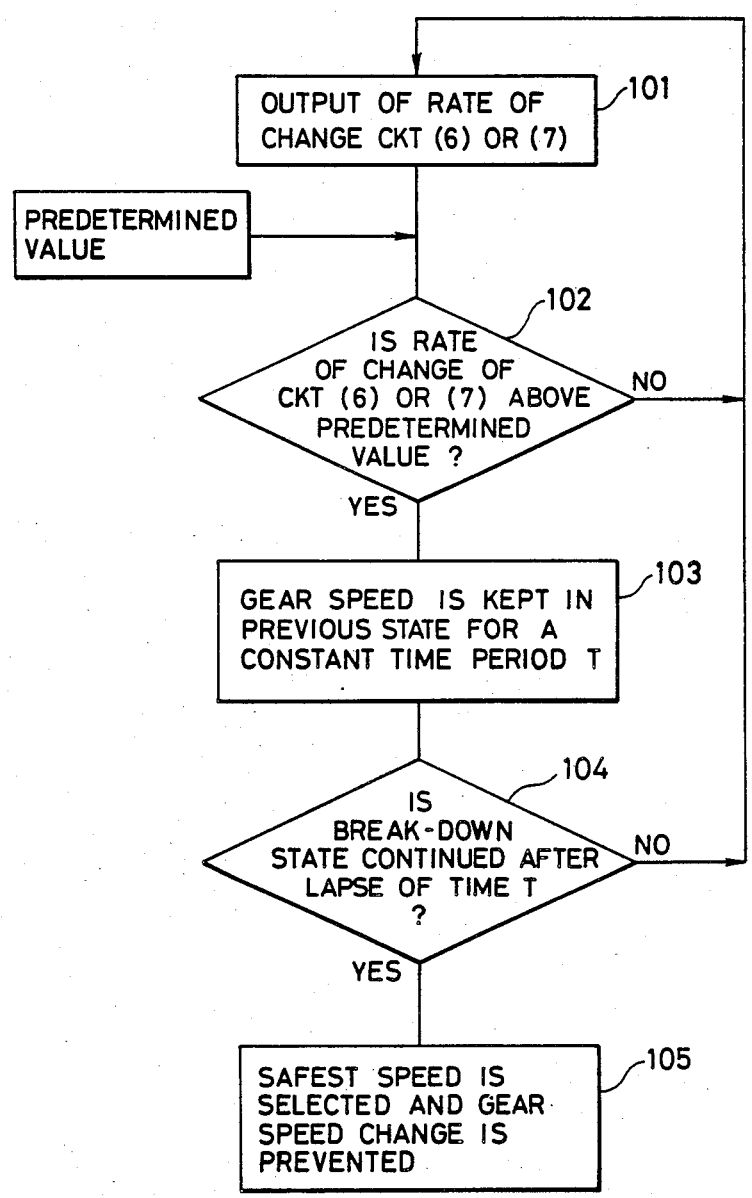

SAFETY CONTROL DEVICE FOR AUTOMATIC TRANSMISSION

BACKGROUND OF THE INVENTION

The present invention relates to a control apparatus for an automatic transmission of a motor vehicle in which the optimum running gear, and hence the correct control oil pressure in the transmission, are determined in accordance with signals representing the engine load and vehicle speed.

In such a control apparatus, the engine load and vehicle speed are represented by electric signals. The optimum running gear and corresponding optimum control oil pressure for various running conditions are determined in response to these signals by an electronic arithmetic circuit. The electronic arithmetic circuit drives solenoid valves which control an oil pressure clutch or oil brake of the transmission mechanism so as to smoothly effect gear changes in accordance with the input signals representing the engine load and vehicle speed.

To provide the signals representing the engine load and vehicle speed, typically, devices such as a potentiometer, which produces an electric signal in proportion to the amount of opening of the engine throttle, and a magnetic pickup, which produces a voltage or frequency signal indicative of the rate of rotation of the output shaft of the transmission, are employed. These signals are processed by the electronic arithmetic circuit so as to effect shifting towards lower gears as the amount of the throttle opening increases.

However, if a fault occurs in the speed sensor such that, for instance, its output suddenly falls to zero when the vehicle is operated at a high speed, the transmission will suddenly be shifted to first gear. This is dangerous in that, not only does the engine overrev, but skidding may occur. To overcome this drawback, it has been the practice to detect such a fault and to lock the transmission in an intermediate gear is which the stability is relatively high. However, in the conventional system, this safety measure was effected even if the fault in the output of the speed sensor was temporary, such as may be due to vibration, shock, or electrical surges. Accordingly, the safety circuit tended to be actuated in situations in which such was not really necessary.

SUMMARY OF THE INVENTION

In view of the above, it is a primary object of the present invention to provide a control apparatus for an automatic transmission for a motor vehicle which is substantially insensitive to temporary abnormalities in the outputs of sensors which provide signals representing the operating state of the vehicle, such as the speed of the vehicle and the throttle opening.

A further object of the present invention is to provide such a control apparatus in which, when an abnormality in one of the sensor outputs continues over a predetermined period of time, the transmission is set to a safe gear, and further gear change operations are inhibited, thereby to prevent dangerous conditions from occurring.

In accordance with the above and other objects, the present invention provides a control apparatus for an automatic transmission of a motor vehicle including a gear change timing arithmetic circuit which determines the times of gear change on the basis of at least a signal representing the load on the engine of the vehicle and the speed of the vehicle. A fault detecting circuit detects the existence of a fault in the load and speed signals. Also, rate-of-change detecting circuits detect variations in the load and speed signals and produce output signals in response thereto when the rate of change in the load and speed signals exceeds predetermined threshold values. When the latter signals are present, gear change operations are inhibited for a predetermined period of time, and operations performed in response to the outputs of the fault detecting circuit are delayed for that period of time.

BRIEF DESCRIPTION OF THE DRAWINGS

FIG. 4 is a flowchart used for explaining the operation of the present invention.

DESCRIPTION OF THE PREFERRED EMBODIMENTS

Figure 1:
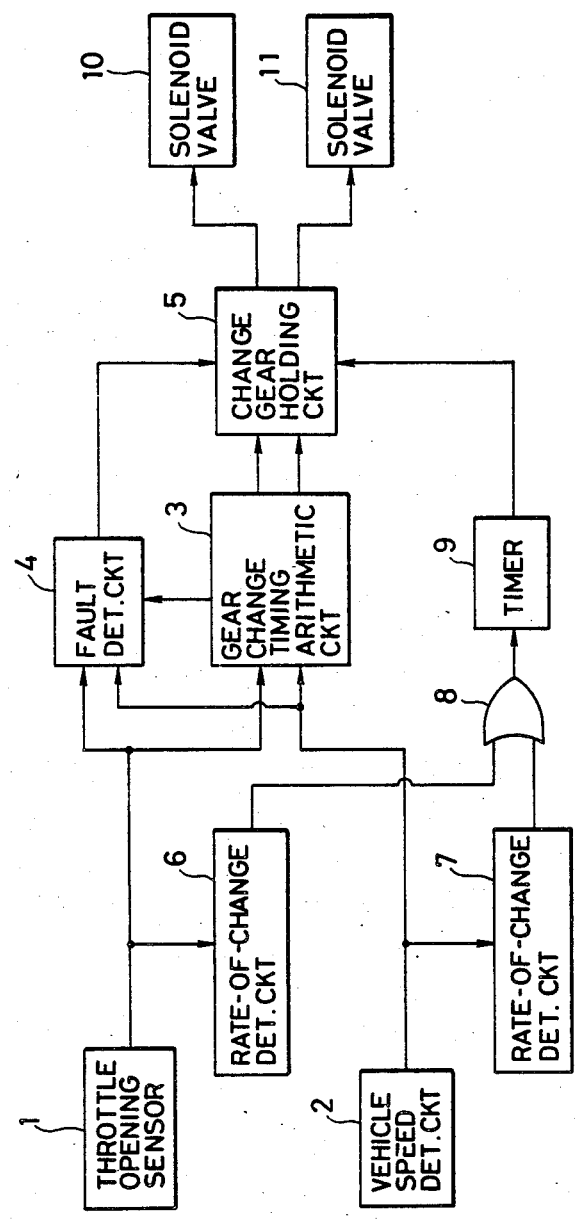
FIG. 1 is a block diagram showing the arrangement of a control apparatus for an automatic transmission constructed in accordance with the present invention.

Referring to the drawings, a preferred embodiment of a safety control device for an automatic transmission constructed in accordance with the teachings of the present invention will now be described. In FIG. 1, which is a block diagram showing the arrangement of a preferred embodiment of the inventive control device, reference numeral 1 indicates a throttle opening sensor which produces an electrical signal having a magnitude corresponding to the amount of opening of the throttle of the engine. The output of the throttle opening sensor 1 is applied to a gear change timing arithmetic circuit 3, a fault detecting circuit 4, and a rate-of-change detecting circuit 6.

Further in FIG. 1, reference numeral 2 designates a speed sensor which produces a voltage or frequency signal having a voltage or frequency in proportion to the rotational rate of an output shaft of the transmission of the vehicle, that is, corresponding to the speed of the vehicle. The output of the vehicle speed detecting circuit 2 is applied to corresponding inputs of the gear change timing arithmetic circuit 3, the fault detecting circuit 4, and a second rate-of-change detecting circuit 7.

Figure 3:
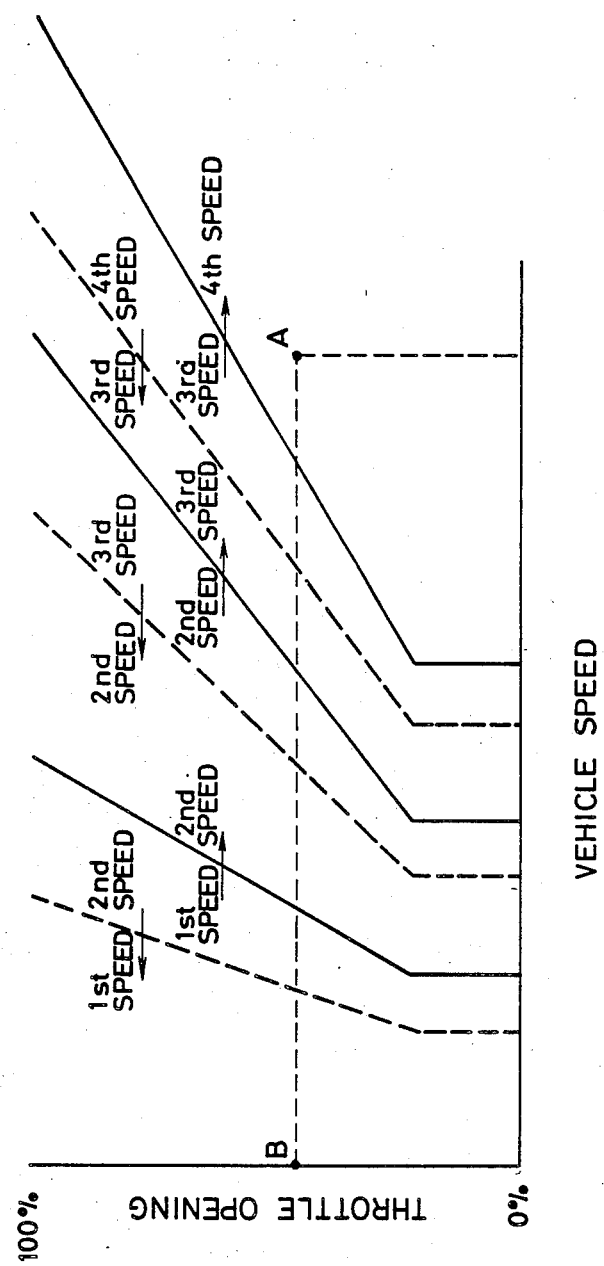
FIG. 3 is a graph showing transmission characteristics and is used for explaining the operation of the control device of the present invention.

The gear change timing arithmetic circuit 3 determines the optimum times for changing gears in accordance with the output signals from the throttle opening sensor 1 and the vehicle speed detecting circuit 2 in accordance with predetermined characteristics, an example of which is shown in FIG. 3. As the curves of FIG. 3 show, as the throttle is opened further, the tendency to shift to lower gears is increased.

The fault detecting circuit 4 detects an open circuit or a short circuit to detect faults accordingly. The output of the fault detecting circuit 4 is applied to a change gear holding circuit 5, as is the output of the change gear timing arithmetic circuit 3. The change gear holding circuit 5 locks the transmission in the safest gear, generally, in the highest gear or the next highest gear, when the fault detecting circuit 4 has indicated a fault.

Operating in response to the output signals from the throttle opening sensor 1 and vehicle speed detecting circuit 2, the rate-of-change detecting circuits 6 and 7 produce output signals in an active state when the rates of change of the respective input signals exceed respective predetermined levels. The outputs of the rate-of-change detecting circuits 6 and 7 are ORed together with an OR gate 8, the output of which is applied to the trigger input of a timer 9. When the output of the OR gate 8 is in the active state indicating that one of the rate-of-change detecting circuits 6 and 7 has detected the occurrence of a rate of change of one of the outputs of the throttle opening sensor 1 or vehicle speed detecting circuit 2 exceeding the predetermined level, the timer 9 is actuated. The output of the timer 9 is applied to the change gear holding circuit 5 to cause the latter to prevent the transmission from being shifted to another gear, regardless of the state of the outputs of the gear change timing arithmetic circuit 3, until the timer 9 has completed its timing operation.

Reference numerals 10 and 11 designate solenoid valves provided in an oil pressure control circuit (not shown) of the transmission. The solenoid valves 10 and 11 are operated in accordance with the output signals from the gear change holding circuit 5 such that, for example, the transmission is set to the fourth gear when only the solenoid valve 11 is actuated, the third gear when neither of the solenoid valves 10 and 11 is actuated, the second gear when only the solenoid valve 10 is actuated, and the first gear when the both of the solenoid valves 10 and 11 are actuated.

Figure 2:
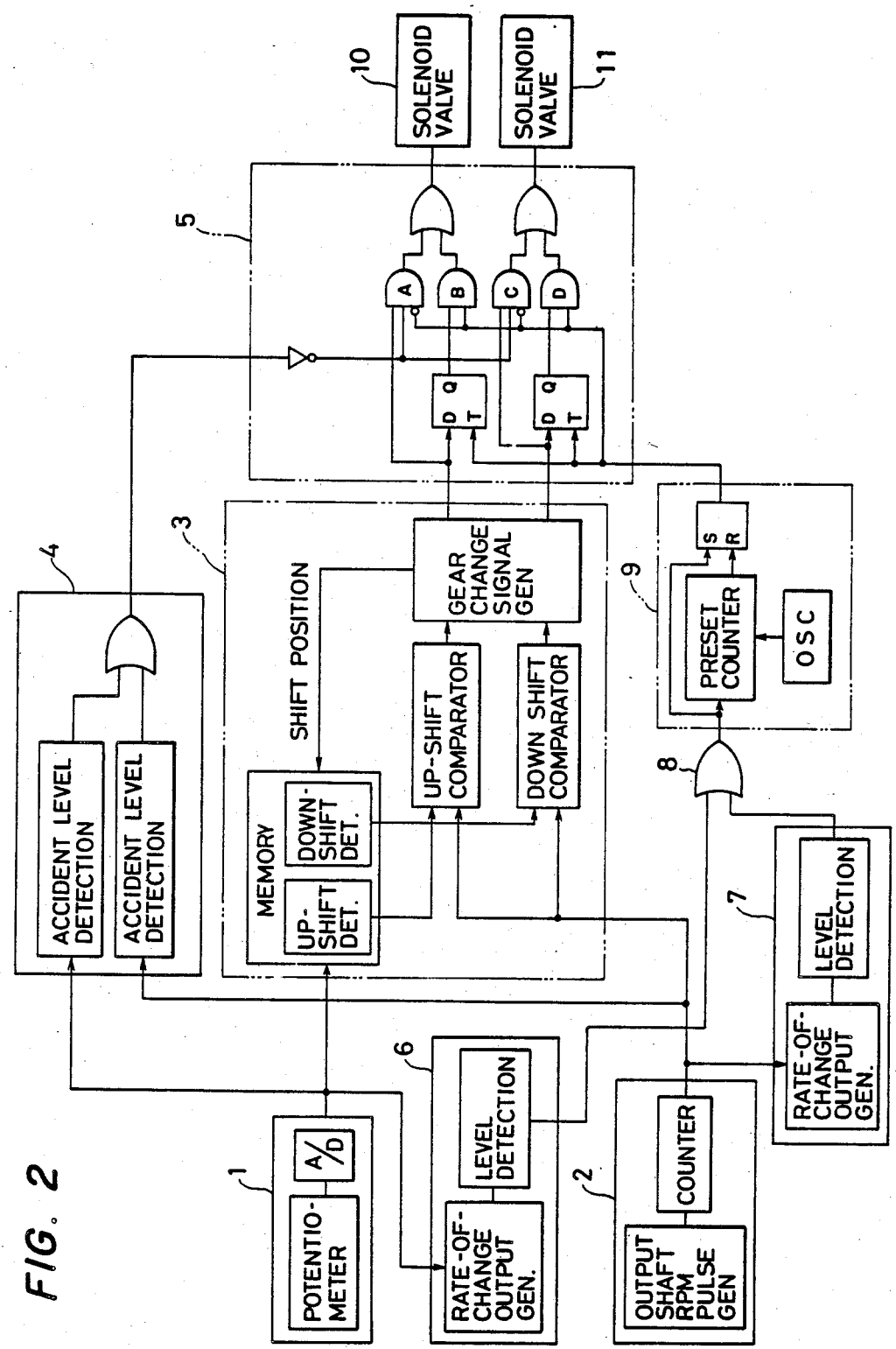
FIG. 2 is a more detailed diagram of the arrangement of FIG. 1.

Referring now to FIG. 2, the detailed construction of the various elements depicted in FIG. 2 will be described.

The throttle opening sensor 1 is implemented with a potentiometer, which produces a voltage output in proportion to the amount of the throttle opening, and an analog-to-digital converter, which converts the output voltage from the potentiometer to a digital value.

The vehicle speed sensor 2 is constituted by a pulse generator, which produces pulses at a rate determined by the rate of rotation of the output shaft of the transmission, and a counter, which counts the pulses from the pulse generator to produce a digital output signal representative of the speed of the vehicle.

The gear change timing arithmetic circuit 3 includes a memory composed of an up-shift characteristic memory in which is stored data representing the solid-line up-shift characteristic of FIG. 3 correlating the throttle opening to speed, and a down-shift characteristic memory in which is stored data representing the broken-line shift-up characteristic of FIG. 3. Based upon the detected throttle opening and the current gear position, a desired vehicle speed and shift characteristic are read out of the memory. The read-out desired vehicle speed is compared with the actual vehicle speed with an up-shift comparator and a down-shift comparator. As a result of these comparison operations, an UP instruction is issued if, as indicated by the output of the up-shift comparator, the actual vehicle speed is greater than the desired speed, and a DOWN instruction is issued if, as indicated by the output of the down-shift comparator, the actual vehicle speed is less than the desired speed. Otherwise, an instruction to hold the current gear position is issued. A gear change signal generating circuit provides logic outputs for controlling the solenoid valves 10 and 11 in the manner described above in accordance with the outputs of the up-shift comparator and the down-shift comparator.

The rate-of-change detecting circuits 6 and 7 include circuits which produce output signals having a magnitude in proportion to the amount of change in the outputs of their respective sensors, and a level detecting circuit which determines whether the level of the rate-of-change signal exceeds a predetermined level.

The fault detecting circuit 4 includes a pair of level detecting circuits which detect whether the output levels of the respective sensors have reached abnormal levels in either the positive or negative direction, that is, due to a short-circuit or open-circuit condition.

The timer 9 is constituted by a counter which is reset by the output of the OR gate 8. The output of the OR gate 8 also is used to set an RS flip-flop. The counter counts the clock pulses of a constant-frequency pulse signal provided by an oscillator. When the count value held by the counter reaches a predetermined level, it resets an RS flip-flop, which then produces an H-level (high-level) output signal during the subsequent operating period of the counter.

The gear change holding circuit 5 includes two D-type flip-flops triggered by the output of the RS flip-flop of the timer 9. Specifically, the D-type flip-flops are clocked on the leading edge of the output signal from the RS flip-flop of the timer 9 to store the data signals then being provided thereto by the gear change signal generating circuit of the gear change timing arithmetic circuit 3. The outputs of the two D-type flip-flops are applied to a gating circuit composed of four AND gates through D, two OR gates and an inverter to actuate the solenoid valves 10 and 11 in the manner described above. Specifically, if no fault has been detected, the outputs of the gear change signal generating circuit 3 are passed through the AND gates A and C and the OR gates to the solenoid valves 10 and 11 because the output from the inverter is then at the H level due to the absence of a fault. On the other hand, when the fault detecting circuit 4 has detected the presence of a fault, and hence when its output is at the H level, the output of the inverter will be an L-level (low-level) signal, thereby connecting the outputs of the D-type flip-flops through the respective AND gates B and D and the OR gates to the solenoid valves 10 and 11, thereby applying to the solenoid valves 10 and 11 the outputs from the gear change signal generating circuit which were previously stored in the D-type flip-flops by operation of the timer 9.

Referring now to FIG. 3, the operation of the control apparatus of the invention will now be described in more detail.

Assuming now that the vehicle is running in the state corresponding to point A in FIG. 3 wherein the throttle is open to some extent and the vehicle is running in a steady-state condition, the fourth (highest) gear is engaged; that is, the solenoid valves 10 and 11 will be in the nonactuated and actuated states, respectively. In this condition, if, for instance, the output of the vehicle speed detecting circuit 2 suddenly falls to zero due to an open-circuit fault, the operating point designated by the outputs of the sensor 1 and speed detecting circuit 2 shifts to the point B. Accordingly, the gear change timing arithmetic circuit 3 produces an output which would indicate that the transmission should immediately change the engaged gear to the first (lowest) gear. However, is this were done, the vehicle would likely go into a skid.

With the invention, however, this does not happen. As indicated by the flowchart of FIG. 4, when such a fault condition is detected, the outputs of the throttle opening sensor 1 and vehicle speed detecting circuit 2 are detected by the rate-of-change detecting circuits 6 and 7, respectively, at a step 101 and compared with the predetermined comparison values in a step 102. As a result of the comparison, the time 9 is actuated through the OR gate 8. Hence, regardless of the instruction generated by the gear change timing arithmetic circuit 3, in a step 103, the transmission is held in the present gear by the gear change holding circuit 5 for the time counted out by the timer 9. In a step 104, it is determined whether or not the fault condition has continued beyond the predetermined period of time counted out by the timer 9. If the fault condition has continued, the gear change holding circuit 5 is actuated by the fault signal produced by the fault detecting circuit 4 to thereby change the transmission gear setting to the safest gear, here assumed to be the third gear. Further gear changes are thereafter inhibited, as indicated at a step 105 in the flowchart of FIG. 4.

This completes the description of the preferred embodiments of the invention. Although preferred embodiments have been described, numerous modifications and alterations thereto are believed to be evident to one of ordinary skilled in the art without departing from the spirit and scope of the invention.

I claim:

1. A control apparatus for an automatic transmission of a motor vehicle, comprising: means for producing a speed signal representing a speed of said vehicle; means for producing a load signal representing a load of said vehicle; means for producing a signal representing a gear to be engaged by said transmission in response to said speed signal and said load signal; means for detecting the existence of a fault condition in said speed signal and said load signal and producing in response thereto a signal representing a fault condition; means for detecting a rate of change in said speed signal and said load signal for producing a signal representing an excessive rate of change; means for controlling a gear engaged by said transmission in response to a signal applied to an input thereof; and gear change instructing means receiving said signal representing said fault condition, said signal representing said excessive rate of change, and said signal representing said gear to be engaged by said transmission, said gear change instructing means comprising means for applying said signal representing said gear to be engaged by said transmission directly to said input of said means for controlling said gear engaged by said transmission when said signal representing fault condition is in an inactive state and means for applying to said input of said means for controlling said gear engaged by said transmission a first value of said signal representing said gear engaged by said transmission detected at initiation of an active state of said signal representing said excessive rate of change when said signal representing said fault condition is in an active state so as to inhibit changes in said gear engaged by said transmission for a predetermined period of time after the occurrence of said active state of said signal representing said excessive rate of change.

2. The control apparatus of claim 1, wherein said gear change instructing means comprises timer means for delaying said signal representing said excessive rate of change.

3. The control apparatus of claim 2, wherein said gear change instructing means further comprises storing means operating in response to an output of said timer means for storing said first value of said signal representing said gear engaged by said transmission, and gating means operating in response to said signal representing said fault condition for selectively applying an output of said storing means to said means for controlling said gear engaged by said transmission when said signal representing said fault condition is in said active state and applying said signal representing said gear to be engaged by said transmission directly to said means for controlling said gear engaged by said transmission when said signal representing said fault condition is in said inactive state.

4. The control apparatus for an automatic tranmsission of claim 1, wherein said means for producing a signal representing a load of said vehicle comprises means for detecting an amount of opening of a throttle of said vehicle 5. A control apparatus for an automatic transmission of a motor vehicle, comprising:
   first means for producing a first signal representing a vehicle operating parameter;
   second means, responsive to said first signal, for producing a second signal representing a gear to be engaged by said transmission;
   third means for detecting the existence of a fault condition in said first signal, and producing in response thereto a third signal representing a fault condition;
   fourth means for detecting a rate of change in said first signal for producing a fourth signal representing an excessive rate of change;
   fifth means for controlling a gear to be engaged by said transmission in response to a fifth signal applied to an input thereof; and
   sixth means for instructing a gear change, said sixth means being responsive to said second, third, and fourth signals, said sixth means comprising means for applying said second signal directly to said input of said fifth means when said third signal is in an inactive state and means for applying to said input of said fifth means a first value of said second signal detected at initiation of an active state of said fourth signal when said third signal is in an active state so as to inhibit changes in said gear engaged by said transmission for a predetermined period of time after the occurrence of said active state of said fourth signal.

* * * * *